(12) United States Patent
Lin et al.

(10) Patent No.: US 12,504,574 B1
(45) Date of Patent: Dec. 23, 2025

(54) LIGHT EMITTING MODULE

(71) Applicant: Chicony Power Technology Co., Ltd., New Taipei (TW)

(72) Inventors: Chun-Ting Lin, New Taipei (TW); Chen-Hao Chiu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/950,698

(22) Filed: Nov. 18, 2024

(30) Foreign Application Priority Data

Oct. 16, 2024 (TW) .................................. 113139430

(51) Int. Cl.
*F21V 8/00* (2006.01)

(52) U.S. Cl.
CPC ........... *G02B 6/005* (2013.01); *G02B 6/0068* (2013.01)

(58) Field of Classification Search
CPC .. G02B 6/0051; G02B 6/0053; G02B 6/0055; G02B 6/0056; G02B 6/0058; G02B 6/005; G02B 6/0068; G02B 6/004; G02B 6/0043; G02B 6/0036; G02B 6/0038
See application file for complete search history.

(56) References Cited

U.S. PATENT DOCUMENTS

| 2012/0014135 | A1 | 1/2012 | Kim |
| 2018/0149800 | A1 | 5/2018 | Kim et al. |
| 2021/0132285 | A1* | 5/2021 | Takase .................. G02F 1/1335 |
| 2024/0402409 | A1* | 12/2024 | Yeh ...................... G02B 6/0021 |

FOREIGN PATENT DOCUMENTS

| CN | 204345415 U | 5/2015 |
| CN | 112445287 A | 3/2021 |
| TW | 201416769 A | 5/2014 |
| TW | 202020540 A | 6/2020 |
| TW | I795316 B | 3/2023 |
| TW | 202320103 A | 5/2023 |
| TW | 202400934 A | 1/2024 |
| TW | 202401113 A | 1/2024 |
| TW | 202403410 A | 1/2024 |
| TW | 202438814 A | 10/2024 |

\* cited by examiner

*Primary Examiner* — Matthew J. Peerce
(74) *Attorney, Agent, or Firm* — Birch, Stewart, Kolasch & Birch, LLP

(57) ABSTRACT

A light emitting module includes a base, a light guide sheet, a circuit board, a light emitting unit, and a film. The base includes a base plate and a first dam disposed on a side of the base plate. The light guide sheet is disposed on the base plate, and includes a light exit region and a light mixing region. The light exit region is adjacent to the first dam. At least a part of the circuit board is disposed on the light mixing region. The light emitting unit is disposed on a surface of the circuit board close to the light guide sheet. The film is disposed on the light guide sheet and the circuit board, and includes a first zone and a second zone. A transmittance of the first zone is greater than a transmittance of the second zone.

8 Claims, 11 Drawing Sheets

LIGHT EMITTING MODULE

CROSS-REFERENCE TO RELATED APPLICATION

This non-provisional application claims priority under 35 U.S.C. § 119(a) to patent application No. 113139430 filed in Taiwan, R.O.C. on Oct. 16, 2024, the entire contents of which are hereby incorporated by reference.

BACKGROUND

Technical Field

The present disclosure relates to the technical field of light emitting modules, and in particular to a light emitting module applied to an electronic product.

Related Art

Light emitting modules are widely used in various electronic products to provide visual effects for the electronic products. However, current light emitting modules are prone to problems such as uneven brightness and lateral stray light, and cannot provide good visual effects for electronic products.

SUMMARY

To resolve the foregoing technical problems, the present disclosure provides a light emitting module comprising a base, a light guide sheet, a circuit board, a light emitting unit, and a film. The base comprises a base plate and a first dam disposed on a side of the base plate. The light guide sheet is disposed on the base plate, and comprises a light exit region and a light mixing region. The light exit region is adjacent to the first dam. At least a part of the circuit board is disposed on the light mixing region. The light emitting unit is disposed on a surface of the circuit board close to the light guide sheet. A light emitted by the light emitting unit enters the light mixing region, and exits from the light exit region. The film is disposed on the light guide sheet and the circuit board, and comprises a first zone and a second zone. A transmittance of the first zone is greater than a transmittance of the second zone.

According to some embodiments of the present disclosure, a thickness of the first dam is greater than a thickness of the light guide sheet.

According to some embodiments of the present disclosure, the first zone is located above the light exit region, and the second zone is located above the circuit board.

According to some embodiments of the present disclosure, the film further comprises a third zone located between the first zone and the second zone. A transmittance of the third zone is greater than the transmittance of the second zone and less than the transmittance of the first zone.

According to some embodiments of the present disclosure, the light mixing region has no microstructure, the light exit region has a plurality of microstructures, and a density of the microstructures gradually increases in a direction from the light exit region toward the first dam.

According to some embodiments of the present disclosure, the film is disposed on the first dam, and covers the light guide sheet and the circuit board.

According to some embodiments of the present disclosure, the light emitting module further comprises a light shielding member disposed above the first dam.

According to some embodiments of the present disclosure, a width of the light shielding member is greater than a width of the first dam.

According to some embodiments of the present disclosure, the light emitting module further comprises a second dam extending from an end of the first dam and forms a receiving space with the first dam and the base plate. The light exit region of the light guide sheet and the film are partially accommodated in the receiving space.

According to some embodiments of the present disclosure, the base plate is ring-shaped, and the light guide sheet is disposed on at least a part of the base plate.

DETAILED DESCRIPTION

Figure 1:
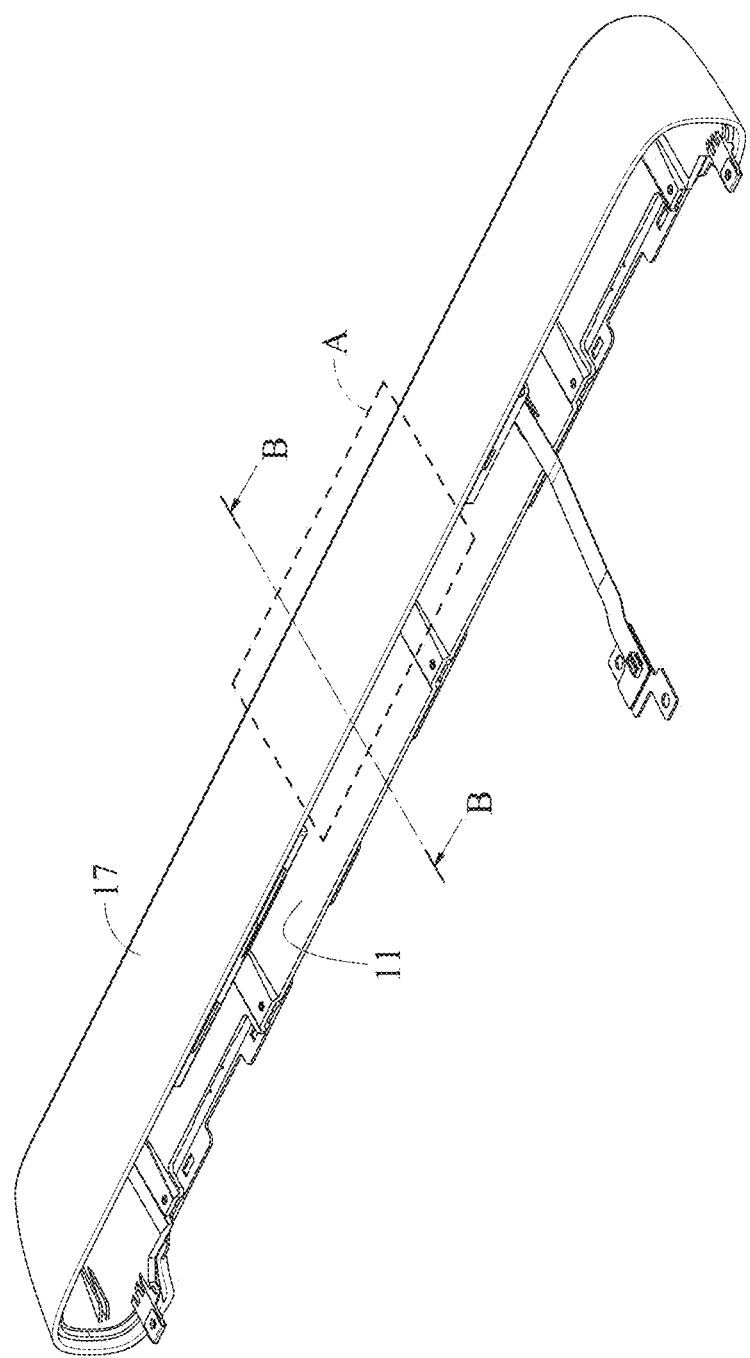
FIG. 1 is a schematic diagram of a light emitting module according to an embodiment of the present disclosure.

Various embodiments of the present disclosure are described in detail below with reference to the accompanying drawings. The drawings are for illustrative purposes only, and do not represent actual sizes or quantities of components. Furthermore, some details are not shown in the drawings for sake of simplicity. Directional terms used herein, such as upper, lower, left, right, inside, outside, side, and center, are used to describe orientation or positional relationship of components in the drawings to simplify description of the present disclosure, and are not used to limit the present disclosure.

Figure 2:
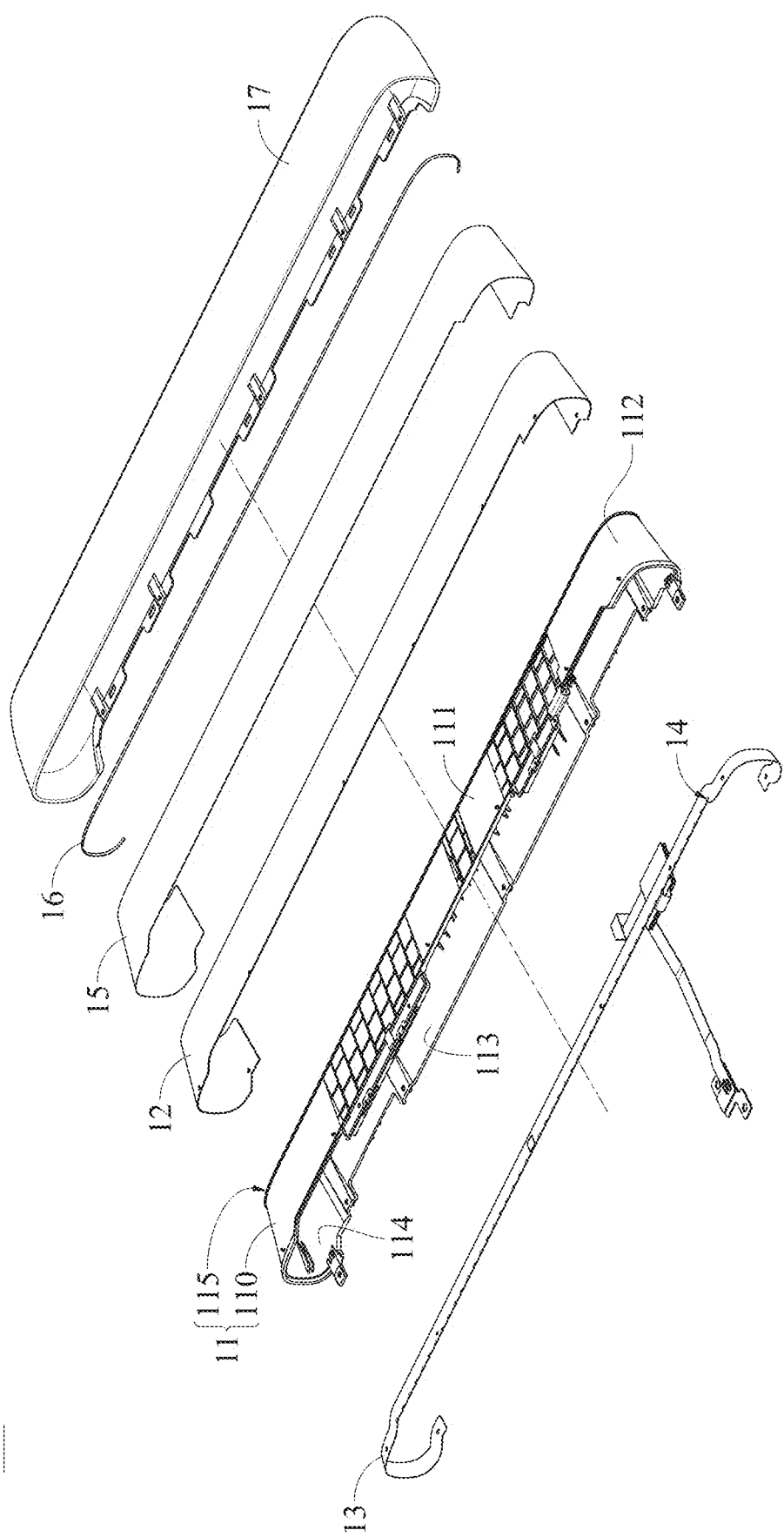
FIG. 2 is a schematic exploded view of the light emitting module of FIG. 1.
Figure 3:
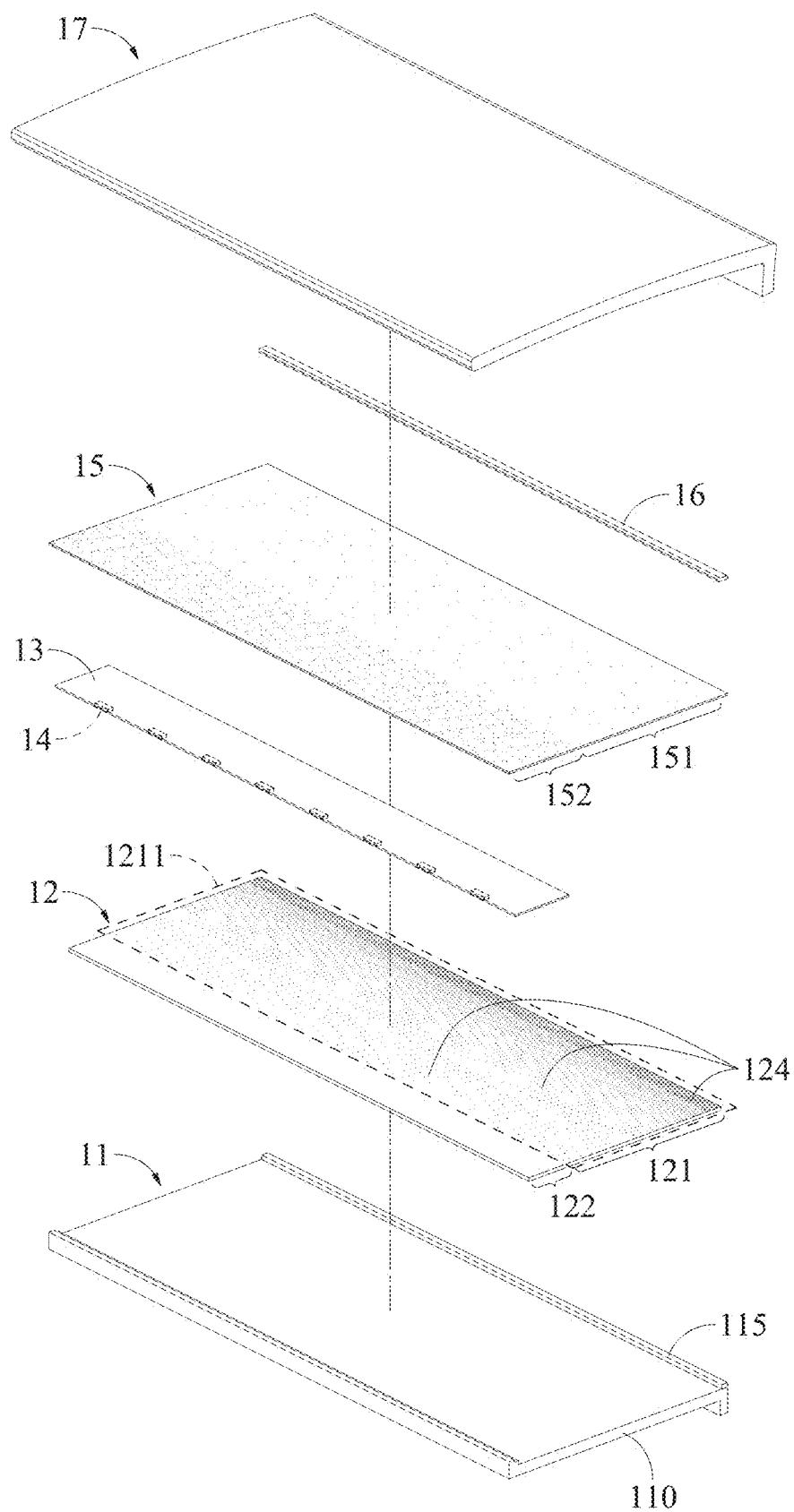
FIG. 3 is a schematic partial exploded view of the light emitting module of FIG. 1 in a region A.
Figure 4:
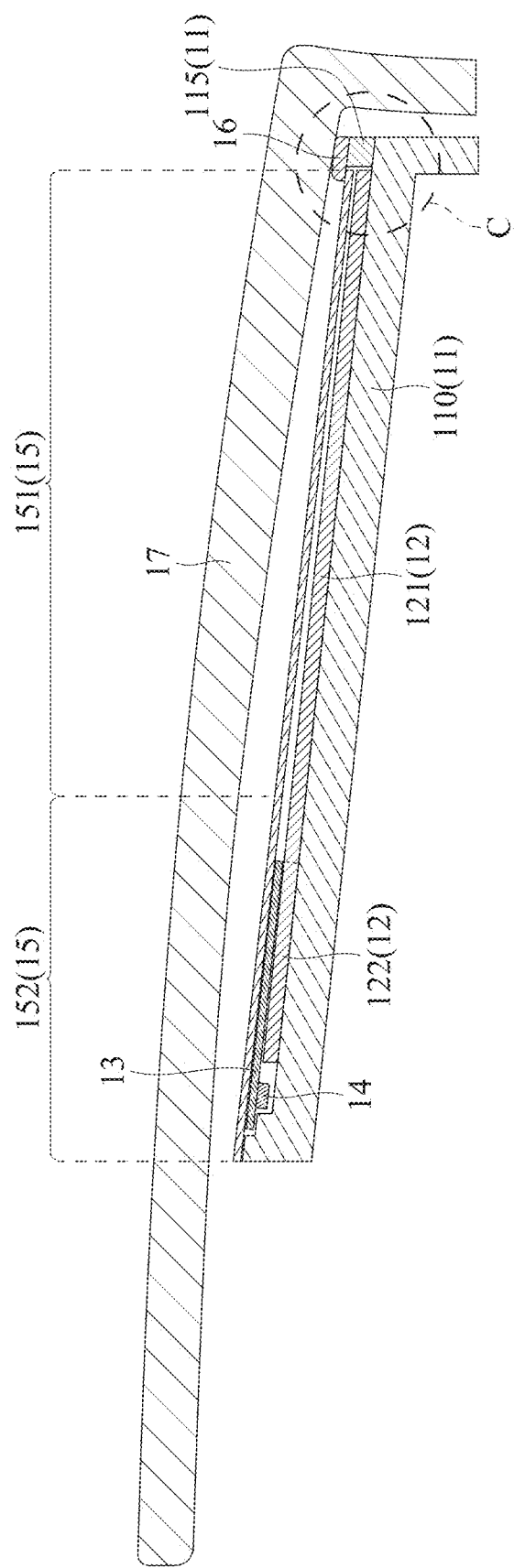
FIG. 4 is a schematic cross-sectional view of an upper portion of the light emitting module of FIG. 1 along a section line B-B.
Figure 5:
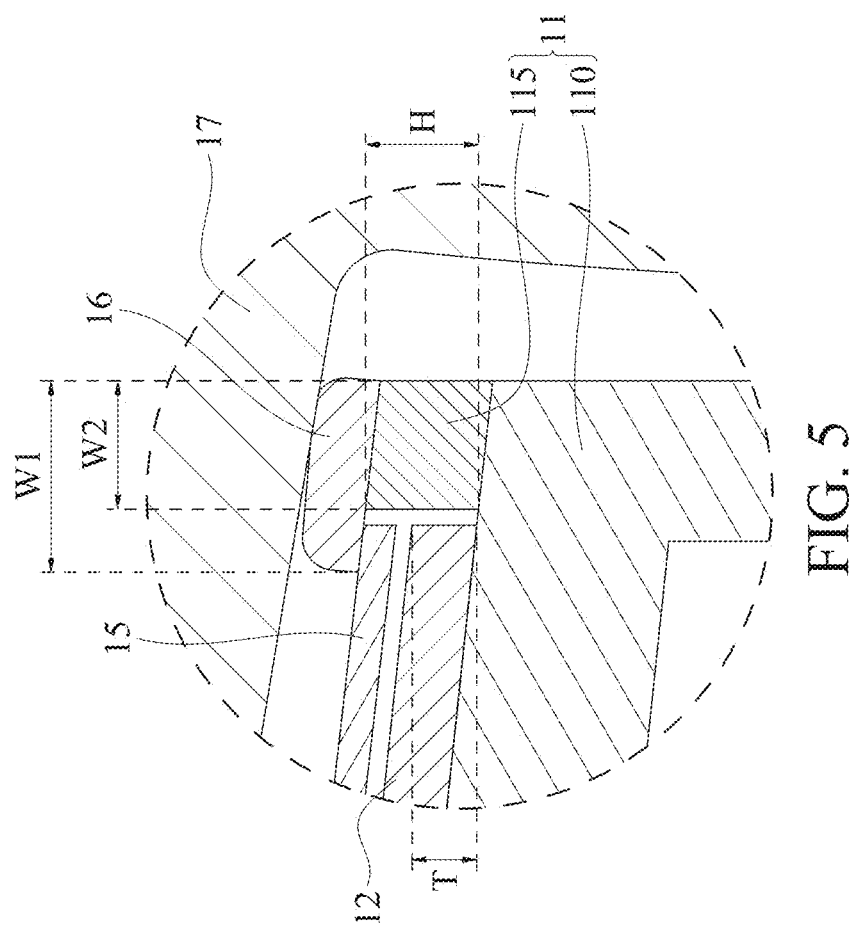
FIG. 5 is a schematic partial enlarged view of the light emitting module of FIG. 4 in a region C.

Referring to FIG. 1 and FIG. 2, an embodiment of the present disclosure provides a light emitting module 100 comprising a base 11, a light guide sheet 12, a circuit board 13, a light emitting unit 14, and a film 15. Referring to FIG. 2 to FIG. 4, the base 11 comprises a base plate 110 and a first dam 115 disposed on a side of the base plate 110. The light guide sheet 12 is disposed on the base plate 110, and comprises a light exit region 121 and a light mixing region 122. The light exit region 121 is adjacent to the first dam 115. That is, the light exit region 121 is located between the light mixing region 122 and the first dam 115. Referring to FIG. 4, at least a part of the circuit board 13 is disposed on the light mixing region 122. The light emitting unit 14 is disposed on a surface of the circuit board 13 close to the light guide sheet 12. A light emitted by the light emitting unit 14 enters the light mixing region 122 of the light guide sheet 12, and exits from the light exit region 121 of the light guide sheet 12. Specifically, the light emitted by the light emitting unit 14 is homogenized in the light mixing region 122 before exiting from the light exit region 121, which prevents bright spots from appearing in the light exit region 121 of the light guide sheet 12. Furthermore, the first dam 115 shields stray light (i.e. lateral stray light) from a side of the light exit region 121 of the light guide sheet 12 away from the light emitting unit 14, which prevents stray light from appearing on a side of the light emitting module 100 away from the light emitting unit 14. Referring to FIG. 4 and FIG. 5, in an embodiment, a height H of the first dam 115 is greater than a thickness T of the light guide sheet 12, so that the first dam 115 more effectively shields the lateral stray light from the light guide sheet 12. In addition, the first dam 115 also limits a position of the light guide sheet 12 on the base 11, so that the light guide sheet 12 can be placed in a correct position during assembly, thereby increasing assembly convenience of the light emitting module 100. In an embodiment, the first dam 115 and the base plate 110 are integrally formed.

Referring to FIG. 3, the film 15 is disposed on the light guide sheet 12 and the circuit board 13. The film 15 comprises a first zone 151 and a second zone 152. A transmittance of the first zone 151 is greater than a transmittance of the second zone 152. That is, the transmittance of the second zone 152 is less than the transmittance of the first zone 151. Referring to FIG. 4, the first zone 151 is located above the light exit region 121, and the second zone 152 is located above the circuit board 13. Specifically, a side of the first zone 151 is adjacent to the first dam 115, the second zone 152 is adjacent to a side of the first zone 151 away from the first dam 115, and the second zone 152 covers an entirety of the circuit board 13. In this embodiment, the second zone 152 covers a side of the circuit board 13 away from the light emitting unit 14, so that the second zone 152 effectively obscures the side of the circuit board 13 away from the light emitting unit 14 visually, and the light emitting module 100 presents a more uniform visual effect. In this embodiment, the transmittance of the second zone 152 may be slightly greater than transmittance of the circuit board 13, but is not limited thereto, as long as the second zone 152 can visually obscure the side of the circuit board 13 away from the light emitting unit 14. In another embodiment, the side of the circuit board 13 away from the light emitting unit 14 is aligned with a side of the second zone 152 away from the light emitting unit 14, and the first zone 151 has gradually decreasing transmittance in a direction from the first zone 151 toward the second zone 152, so that the film 15 also effectively obscures the side of the circuit board 13 away from the light emitting unit 14 visually. The transmittance of the second zone 152 may be slightly greater than or equal to the transmittance of the circuit board 13. In another embodiment, the second zone 152 may also have gradually decreasing transmittance in the direction from the first zone 151 toward the second zone 152.

In addition, in this embodiment, the side of the circuit board 13 away from the light emitting unit 14 is aligned with a side of the light mixing region 122 adjacent to the light exit region 121, and a projection of the second zone 152 of the film 15 on the light guide sheet 12 covers an entirety of the light mixing region 122 and a part of the light exit region 121 adjacent to the light mixing region 122 of the light guide sheet 12, so that the second zone 152 effectively obscures the side of the circuit board 13 away from the light emitting unit 14 visually. In another embodiment, the side of the circuit board 13 away from the light emitting unit 14 may be located in the light mixing region 122, and the projection of the second zone 152 of the film 15 on the light guide sheet 12 covers only the entirety of the light mixing region 122 of the light guide sheet 12, so that the second zone 152 also effectively obscures the side of the circuit board 13 away from the light emitting unit 14 visually. In other embodiments, according to an actual required visual effect, an area and/or a transmittance of the first zone 151 and/or the second zone 152 may be adjusted, and/or the first zone 151 and/or the second zone 152 may be designed to have a single transmittance or a gradient transmittance.

Figure 6:
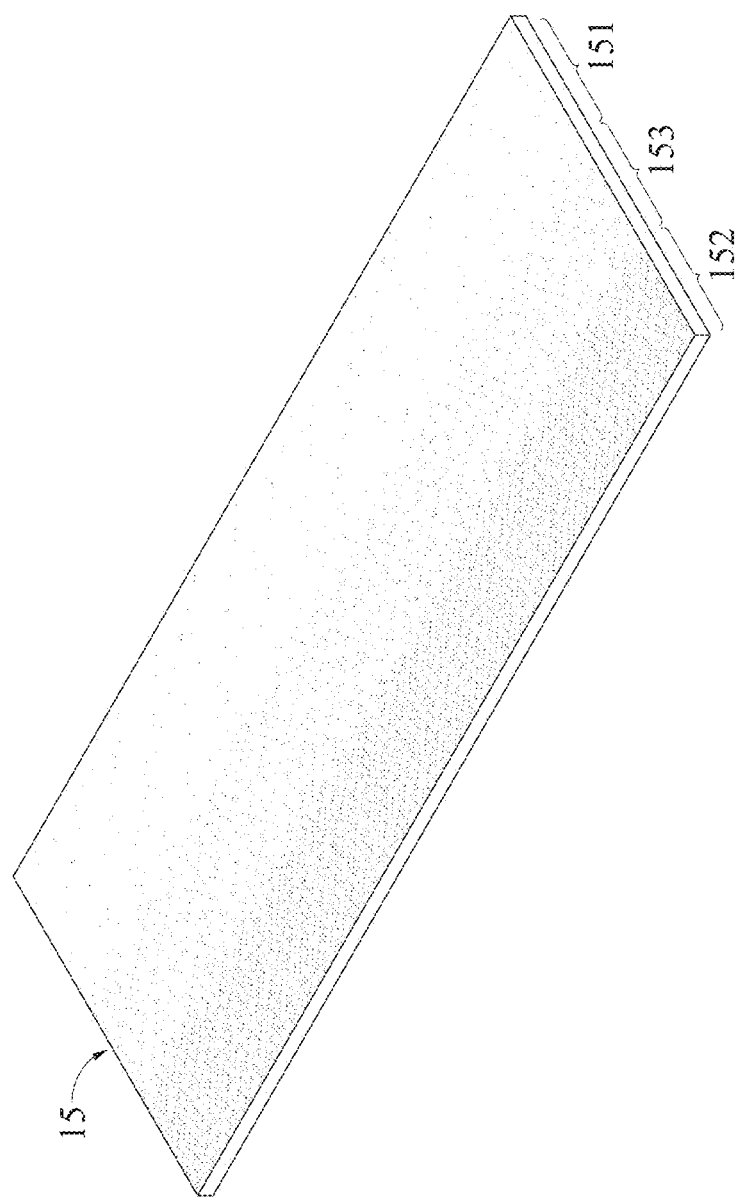
FIG. 6 is a schematic diagram of a film according to another embodiment of the present disclosure.
Figure 8:
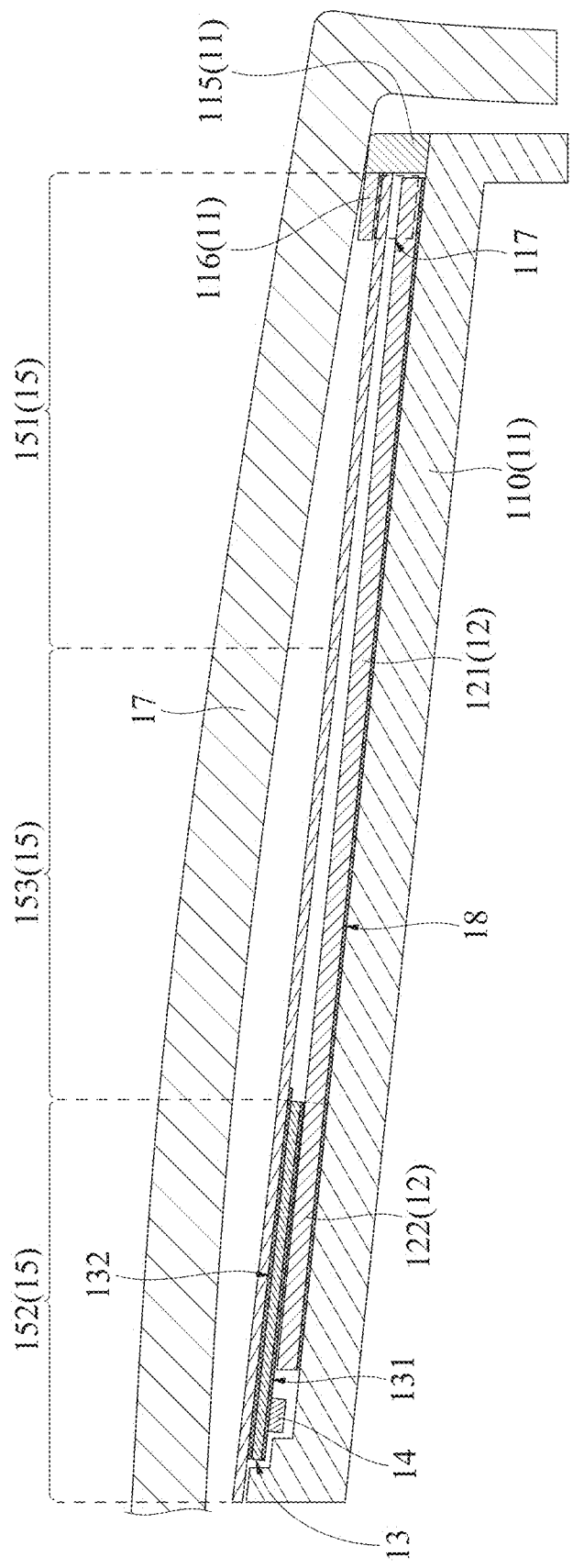
FIG. 8 is a schematic cross-sectional view of an upper portion of a light emitting module according to another embodiment of the present disclosure.

Referring to FIG. 6, in an embodiment, the film 15 further comprises a third zone 153 located between the first zone 151 and the second zone 152. A transmittance of the third zone 153 is greater than the transmittance of the second zone 152 and less than the transmittance of the first zone 151, so that the light emitting module 100 has a visual effect of gradual light emission. Referring to FIG. 8, the third zone 153 covers the side of the circuit board 13 away from the light emitting unit 14 to visually obscure the side of the circuit board 13 away from the light emitting unit 14. In another embodiment, a boundary between the second zone 152 and the third zone 153 may be aligned with the side of the circuit board 13 away from the light emitting unit 14. The transmittance of the second zone 152 may be slightly greater than or equal to the transmittance of the circuit board 13. In an embodiment, the first zone 151 and/or the third zone 153 may have gradually decreasing transmittance in the direction from the first zone 151 toward the second zone 152.

Referring to FIG. 3, the light exit region 121 of the light guide sheet 12 is provided with a plurality of microstructures 124, and the light mixing region 122 of the light guide sheet 12 is not provided with the microstructures 124. In this embodiment, the microstructures 124 are dot-shaped. In other embodiments, the microstructures 124 may be shaped as lines, honeycombs, or other regular or irregular shapes. The microstructures 124 are configured to guide a light in the light exit region 121 upward to exit from a light exit surface 1211 of the light guide sheet 12 and form a plurality of light spots. The film 15 obscures boundaries of the light spots, so that the light emitting module 100 presents a uniform light effect. In addition, referring to FIG. 4, the film 15 also shields light leakage between a side of the circuit board 13 adjacent to the light emitting unit 14 and the base 11.

Referring to FIG. 3, in an embodiment, a density of the microstructures 124 gradually increases in a direction from the light exit region 121 toward the first dam 115. That is, the microstructures 124 in a part of the light exit region 121 close to the light emitting unit 14 are sparser, and the microstructures 124 in a part of the light exit region 121 away from the light emitting unit 14 are denser, so that a brightness of the part of the light exit region 121 close to the light emitting unit 14 is substantially the same as a brightness of the part of the light exit region 121 away from the light emitting unit 14, and the light emitting module 100 presents a more uniform light effect.

Furthermore, referring to FIG. 3, in the part of the light exit region 121 away from the light emitting unit 14, light spots generated by the denser microstructures 124 overlap with each other, so that boundaries of the light spots are not obvious. In the part of the light exit region 121 close to the light emitting unit 14, boundaries of light spots generated by the sparser microstructures 124 are obvious. The second zone 152 of the film 15 as shown in FIG. 3 and the third zone 153 of the film 15 as shown in FIG. 6, which have a lower transmittance than the first zone 151, effectively obscurer the boundaries of the light spots generated by the sparser microstructures 124, so that the light emitting module 100 presents a more uniform light effect.

Figure 7:
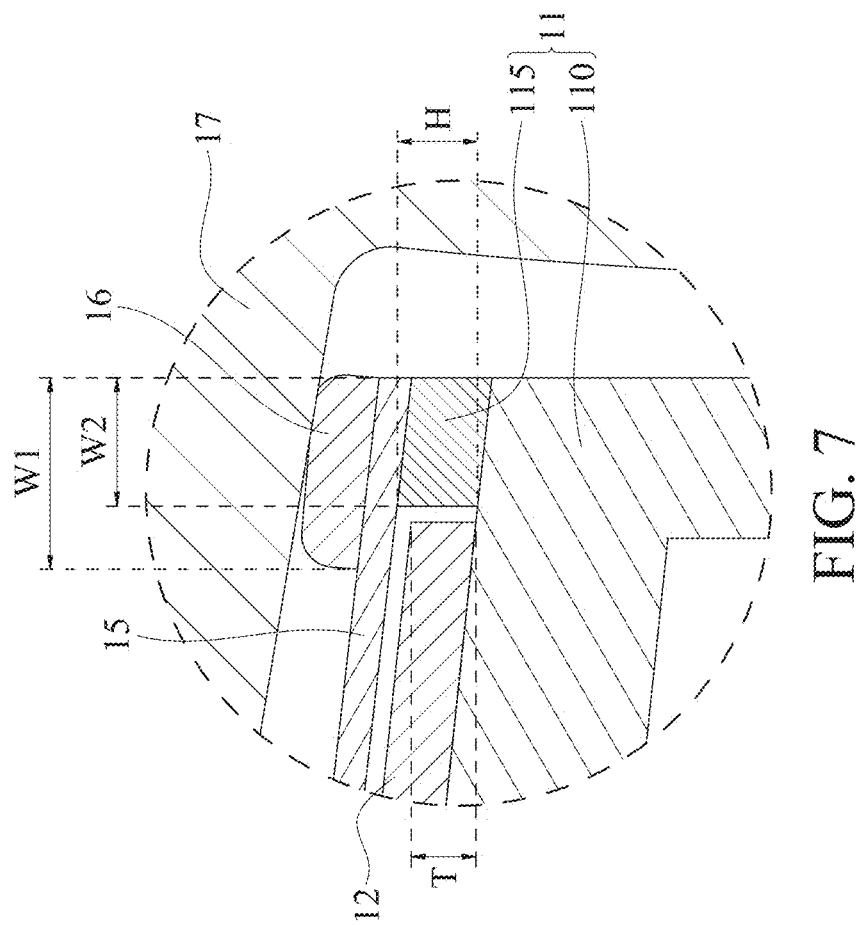
FIG. 7 is a schematic partial cross-sectional view of a light emitting module according to another embodiment of the present disclosure.

Referring to FIG. 4, in this embodiment, the film 15 covers only the light guide sheet 12 and the circuit board 13, thereby achieving the aforementioned effect of the film 15. Referring to FIG. 7, in another embodiment, in addition to covering the light guide sheet 12 and the circuit board 13, the film 15 is further disposed on the first dam 115 to prevent lateral stray light of the light guide sheet 12 from leaking from a gap between the film 15 and the first dam 115 as shown in FIG. 4. In an embodiment, the film 15 is made of a transparent material or a translucent material, and the first zone 151, the second zone 152, and/or the third zone 153 are formed by printing the film 15. The film 15 may be made of polyethylene terephthalate (PET), but is not limited thereto.

Referring to FIG. 2 and FIG. 3, in an embodiment, the light emitting module 100 further comprises a light shielding member 16. Referring to FIG. 5 and FIG. 7, the light shielding member 16 is disposed above the first dam 115 to further shield lateral stray light of the light guide sheet 12. In an embodiment, referring to FIG. 5, the light shielding member 16 is disposed directly on the first dam 115. In another embodiment, referring to FIG. 7, the light shielding member 16 is disposed on the film 15, and corresponds to the first dam 115. In addition, referring to FIG. 5 and FIG. 7, in an embodiment, a width W1 of the light shielding member 16 may be greater than a width W2 of the first dam 115. Specifically, a side of the light shielding member 16 away from the light emitting unit 14 is aligned with a side of the first dam 115 away from the light emitting unit 14, and a projection of the light shielding member 16 on the base 11 partially overlaps with a projection of the light guide sheet 12 on the base 11, thereby improving a shielding effect of the light shielding member 16 on the lateral stray light of the light guide sheet 12. In an embodiment, the light shielding member 16 may be a light shielding strip, a light shielding layer, or a light shielding coating.

Referring to FIG. 8, in an embodiment, the light emitting module 100 further comprises a second dam 116, but does not comprise the light shielding member 16. The second dam 116 extends from an end of the first dam 115, and forms a receiving space 117 with the first dam 115 and the base plate 110. The light exit region 121 of the light guide sheet 12 and the film 15 are partially accommodated in the receiving space 117. The second dam 116 is configured to further shield the lateral stray light of the light guide sheet 12. In an embodiment, the second dam 116 and the first dam 115 are integrally formed. In another embodiment, the base plate 110, the first dam 115, and the second dam 116 may be integrally formed.

Figure 9:
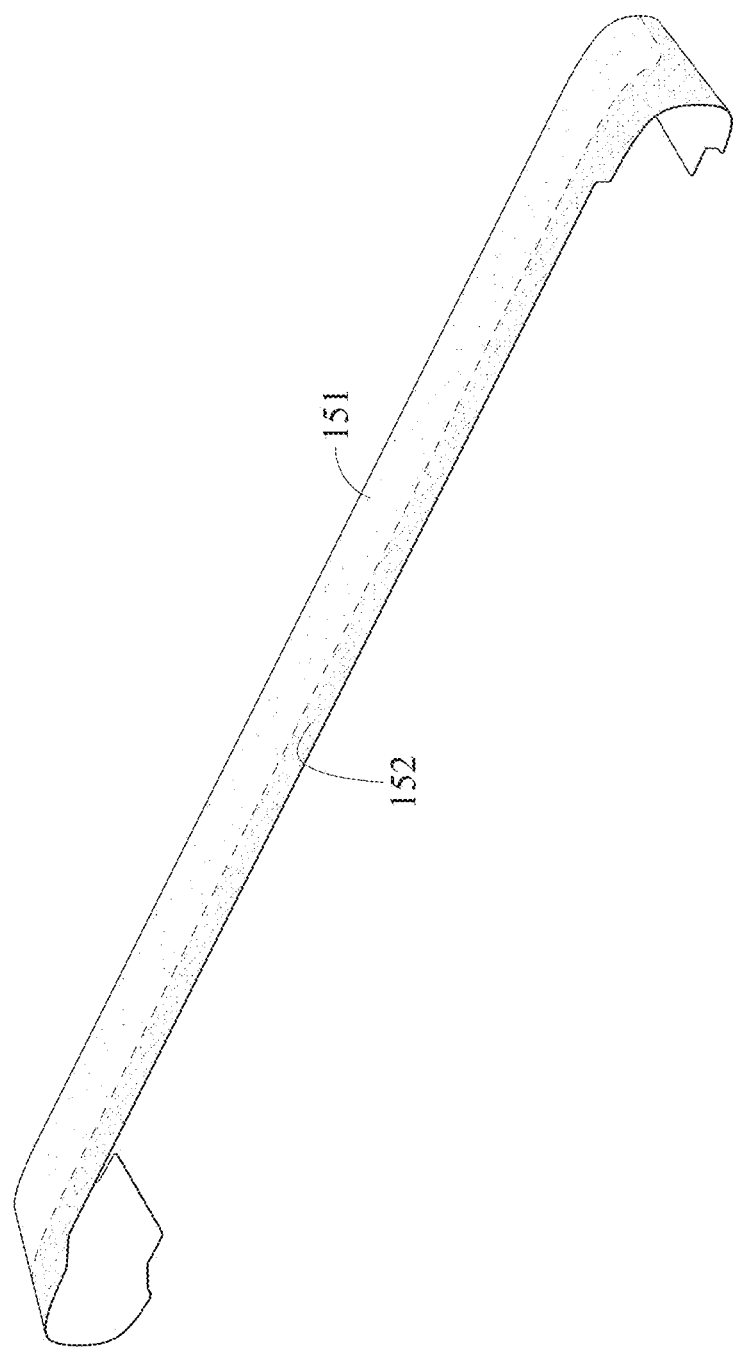
FIG. 9 is a schematic diagram of a film according to still another embodiment of the present disclosure.

Referring to FIG. 2, in some embodiments, the base plate 110 may be ring-shaped, and the light guide sheet 12 may be disposed on at least a part of the base plate 110. Specifically, the base plate 110 is composed of a first portion 111, a second portion 112, a third portion 113, and a fourth portion 114 connected in sequence. The fourth portion 114 is connected to the first portion 111. The first portion 111 is opposite to the third portion 113. The second portion 112 is opposite to the fourth portion 114. The first portion 111 and the third portion 113 may be flat plates, and the second portion 112 and the fourth portion 114 may be curved plates, but are not limited thereto, and they may be designed into different shapes according to actual requirements. Referring to FIG. 2, in an embodiment, the light guide sheet 12 is disposed on the first portion 111, the second portion 112, and the fourth portion 114 of the base plate 110, so that an upper surface, a left surface, and a right surface of the light emitting module 100 present a light emitting effect. In this embodiment, the first dam 115, the circuit board 13, the light emitting unit 14, the film 15, and/or the light shielding member 16 may be disposed above the first portion 111, the second portion 112, and the fourth portion 114 of the base plate 110 corresponding to the light guide sheet 12. Referring to FIG. 9, in an embodiment, the second zone 152 of the film 15 may extend to two opposite sides of the first zone 151 to form a U-shape, so that the light emitting module 100 presents a different light emitting effect. The dashed line shown in FIG. 9 represents a boundary between the first zone 151 and the second zone 152, rather than an actually existing line. In another embodiment, the light guide sheet 12 is disposed only on the first portion 111 of the base plate 110, so that only the upper surface of the light emitting module 100 presents a light emitting effect. In this embodiment, the first dam 115, the circuit board 13, the light emitting unit 14, the film 15, and/or the light shielding member 16 may be disposed only above the first portion 111 of the base plate 110 corresponding to the light guide sheet 12. In this embodiment, the second zone 152 of the film 15 may also extend to the two opposite sides of the first zone 151 to form a U-shape, so that the light emitting module 100 presents a different light emitting effect.

In an embodiment, the light guide sheet 12 is disposed on the first portion 111, the second portion 112, the third portion 113 and the fourth portion 114 of the base plate 110, so that the upper surface, the left surface, the right surface, and a lower surface of the light emitting module 100 all present a light emitting effect. That is, the light guide sheet 12 surrounds the base plate 110, so that the light emitting module 100 presents n ring-shaped light emitting effect. In this embodiment, the first dam 115, the circuit board 13, the light emitting unit 14, the film 15, and/or the light shielding member 16 may be disposed above the first portion 111, the second portion 112, the third portion 113, and the fourth portion 114 of the base plate 110 corresponding to the light guide sheet 12. Referring to FIG. 2, in an embodiment, the light guide sheet 12, the circuit board 13, the film 15, and the light shielding member 16 may be flexible to bend according to a curvature of the second portion 112 and the fourth portion 114 of the base 11. In an embodiment, the circuit board 13 may be a flexible circuit board (FPC).

Referring to FIG. 1, FIG. 2, and FIG. 4, in an embodiment, the light emitting module 100 further comprises a housing 17 for accommodating and protecting the base 11, the light guide sheet 12, the circuit board 13 provided with the light emitting unit 14, the film 15, and/or the light shielding member 16. The housing 17 is a transparent housing or a translucent housing. In an embodiment, the housing 17 is a translucent black housing. When the light emitting unit 14 does not emit light, the light emitting module 100 appears black, so users cannot see all the components in the housing 17. When the light emitting unit 14 emits light, the housing 17 further visually obscures a boundary of the circuit board 13, and obscures the boundaries of the light spots generated by the microstructures 124, so that the light emitting module 100 presents a better visual effect.

Referring to FIG. 2 and FIG. 4, when the light shielding member 16 is the light shielding strip, it can serve as a position-limiting structure for the housing 17. In a manufacturing process, the light guide sheet 12, the circuit board 13 provided with the light emitting unit 14, the film 15, and the light shielding member 16 are sequentially assembled on the base 11, and then the assembled base 11 is pushed into the housing 17. The light shielding member 16 is configured to ensure that a positional relationship between the housing 17 and the assembled base 11 is desired. That is, the light shielding member 16 is configured to ensure that the assembled base 11 is pushed to a desired position in the housing 17. The light shielding member 16 prevents the assembled base 11 from shaking and colliding with the housing 17 to generate abnormal noise. The light shielding member 16 may be a light shielding strip made of a hard material or a flexible material.

When the light shielding member 16 is the light shielding strip made of the flexible material, the light shielding member 16 is deformable, so the assembled base 11 may have an interference fit with the housing 17, thereby improving structural stability of the light emitting module 100. Furthermore, the light shielding member 16 has a buffering ability, so it can more effectively prevent the light emitting module 100 from causing abnormal noise due to shaking. The flexible material may comprise, but is not limited to, silicone, rubber, or polyethylene foam.

Referring to FIG. 8, in an embodiment, the light emitting module 100 may further comprise a first reflective layer 18. The first reflective layer 18 is disposed between the base plate 110 and the light guide sheet 12, and is configured to reflect a light exiting from a surface of the light guide sheet 12 close to the base plate 110 back to the light guide sheet 12 to improve a light effect. A projection of the first reflective layer 18 on the base plate 110 may completely overlap with a projection of the light guide sheet 12 on the base plate 110, so that the first reflective layer 18 can reflect all lights exiting from the surface of the light guide sheet 12 close to the base plate 110 back to the light guide sheet 12. In an embodiment, the first reflective layer 18 may be a coating or a film made of a reflective material.

Referring to FIG. 8, in an embodiment, the light emitting module 100 may further comprise a second reflective layer 131. The second reflective layer 131 is disposed on the surface of the circuit board 13 close to the light guide sheet 12, and is configured to reflect a light exiting from a surface of the light guide sheet 12 close to the circuit board 13 back to the light guide sheet 12 to improve the light effect. In an embodiment, the light emitting module 100 may further comprise a light shielding layer 132. The light shielding layer 132 is disposed on a surface of the circuit board 13 away from the light guide sheet 12, and is configured to absorb or shield the light exiting from the surface of the light guide sheet 12 close to the circuit board 13 to prevent the visual effect of the light emitting module 100 from being affected. In another embodiment, the light shielding layer 132 is disposed on the surface of the circuit board 13 close to the light guide sheet 12. In other embodiments, the light emitting module 100 may comprise both the second reflective layer 131 and the light shielding layer 132. In an embodiment, the second reflective layer 131 may be a coating or a film made of a reflective material, and the light shielding layer 132 may be a coating or a film made of an opaque material.

Figure 10:
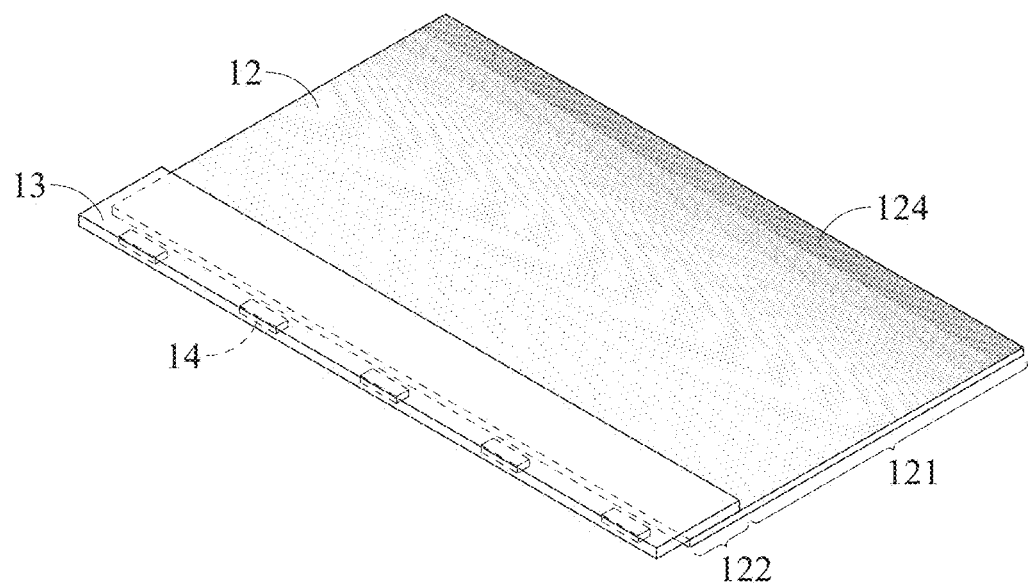
FIG. 10 is a schematic diagram of a light guide sheet, a circuit board, and a light emitting unit according to an embodiment of the present disclosure.
Figure 11:
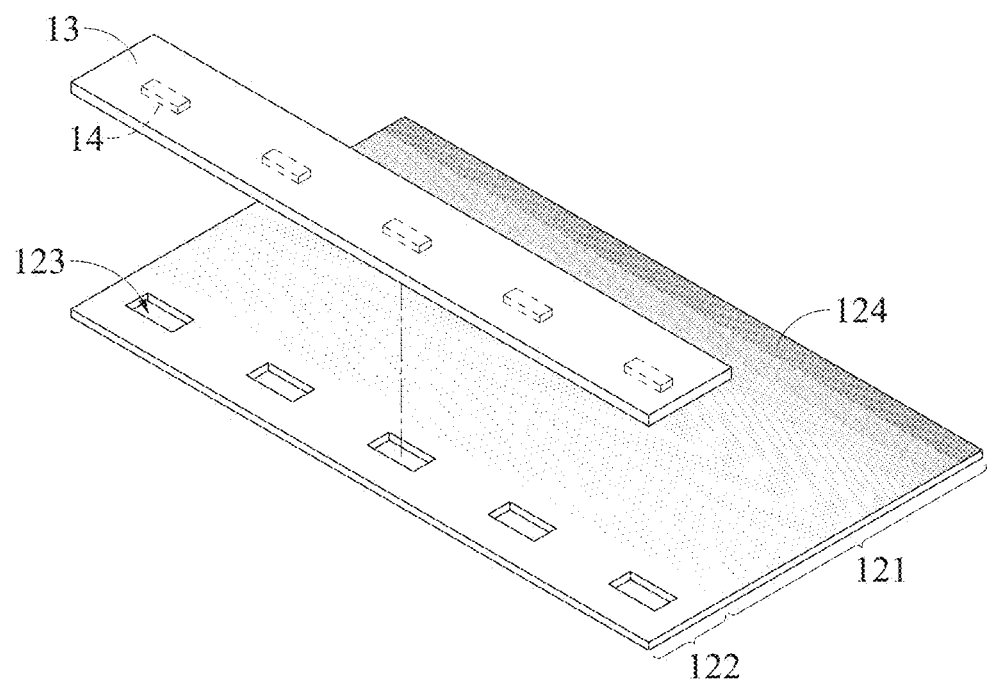
FIG. 11 is a schematic diagram of a light guide sheet, a circuit board, and a light emitting unit according to another embodiment of the present disclosure.

Referring to FIG. 10, in foregoing embodiments, the light emitting unit 14 is disposed adjacent to a side of the light mixing region 122 of the light guide sheet 12, which simplifies a manufacturing process of the light guide sheet 12 and facilitates an assembly process of the circuit board 13 and the light guide sheet 12. Referring to FIG. 11, in another embodiment, the light emitting unit 14 may be accommodated in a through hole 123 of the light mixing region 122 of the light guide sheet 12. In an embodiment, the light mixing region 122 of the light guide sheet 12 is provided with a plurality of the through holes 123, each of the through holes 123 accommodates one light emitting unit 14, and a size of the through holes 123 may be consistent with a size of the light emitting units 14. This arrangement facilitates alignment of the circuit board 13 and the light guide sheet 12 during assembly, and makes the assembled circuit board 13 and the light guide sheet 12 more stable. In another embodiment, each of the through holes 123 may accommodate more than two light emitting units 14. In other embodiments, the light mixing region 122 of the light guide sheet 12 is provided with only one through hole 123 to accommodate all the light emitting units 14.

Figure 12:
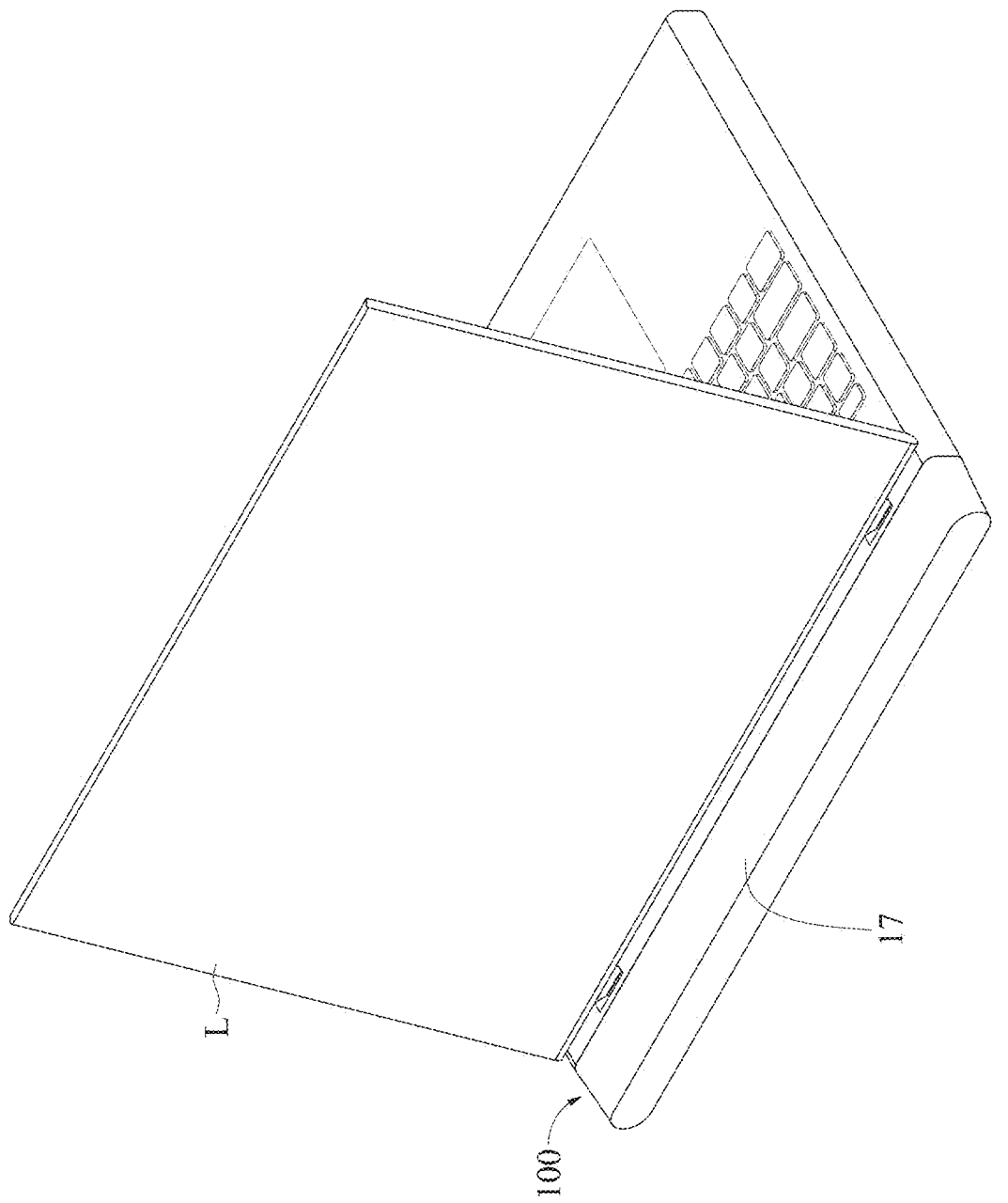
FIG. 12 is a schematic diagram of a light emitting module installed on a notebook computer according to an embodiment of the present disclosure.

The light emitting module 100 may be disposed on various electronic products. Referring to FIG. 12, in an embodiment, the light emitting module 100 is disposed on a notebook computer L. Specifically, a side of the light emitting module 100 close to the light emitting unit 14 is installed on a side of the notebook computer L.

Although the present disclosure is described in detail in foregoing embodiments, the protection scope of the present disclosure is not limited by the foregoing embodiments. Modifications to the technical solutions of the foregoing embodiments or equivalent substitutions of some of the technical features of the foregoing embodiments made by those skilled in the art within the principles of the present disclosure are all included in the protection scope of the present disclosure. The protection scope of the present disclosure shall be subject to the protection scope of the claims.

What is claimed is:

1. A light emitting module, comprising:
   a base comprising a base plate and a first dam disposed on a side of the base plate;
   a light guide sheet disposed on the base plate and comprising a light exit region and a light mixing region, wherein the light exit region is adjacent to the first dam;
   a circuit board, wherein at least a part of the circuit board is disposed on the light mixing region;
   a light emitting unit disposed on a surface of the circuit board close to the light guide sheet, wherein a light emitted by the light emitting unit enters the light mixing region and exits from the light exit region;
   a film disposed on the light guide sheet and the circuit board and comprising a first zone and a second zone, wherein a transmittance of the first zone is greater than a transmittance of the second zone;
   wherein the first zone is located above the light exit region, and the second zone is located above the circuit board; and
   wherein the base plate is ring-shaped, and the light guide sheet is disposed on at least a part of the base plate.

2. The light emitting module according to claim 1, wherein a height of the first dam is greater than a thickness of the light guide sheet.

3. The light emitting module according to claim 1, wherein the film further comprises a third zone located between the first zone and the second zone, and a transmittance of the third zone is greater than the transmittance of the second zone and less than the transmittance of the first zone.

4. The light emitting module according to claim 1, wherein the light mixing region has no microstructure, the light exit region has a plurality of microstructures, and a density of the microstructures gradually increases in a direction from the light exit region toward the first dam.

5. The light emitting module according to claim 1, wherein the film is disposed on the first dam, and covers the light guide sheet and the circuit board.

6. The light emitting module according to claim 1, further comprising a light shielding member disposed above the first dam.

7. The light emitting module according to claim 6, wherein a width of the light shielding member is greater than a width of the first dam.

8. The light emitting module according to claim 1, further comprising a second dam extending from an end of the first dam and forming a receiving space with the first dam and the base plate, wherein the light exit region of the light guide sheet and the film are partially accommodated in the receiving space.

\* \* \* \* \*